United States Patent [19]
Yokota et al.

[11] Patent Number: 5,769,116
[45] Date of Patent: Jun. 23, 1998

[54] COMPOSITE ACTION TYPE WATER-HAMMER-PREVENTIVE CHECK VALVE

[75] Inventors: Hiroshi Yokota; Shingo Yokota, both of Hiroshima, Japan

[73] Assignees: Kabushiki Kaisha Yokota Seisakusho; Hiroshi Yokota; Shingo Yokota, all of Hiroshima-Ken, Japan

[21] Appl. No.: 682,734
[22] PCT Filed: Jan. 27, 1995
[86] PCT No.: PCT/JP95/00097
   § 371 Date: Sep. 13, 1996
   § 102(e) Date: Sep. 13, 1996
[87] PCT Pub. No.: WO95/20735
   PCT Pub. Date: Aug. 3, 1995

[30] Foreign Application Priority Data

Jan. 31, 1994 [JP] Japan ................................ 6-009250
Nov. 21, 1994 [JP] Japan ................................ 6-286509
Jan. 25, 1995 [JP] Japan ................................ 7-009424

[51] Int. Cl.$^6$ ..................................................... F16K 21/10
[52] U.S. Cl. ........................ 137/514; 137/527.4; 137/527
[58] Field of Search .......................... 137/527.4, 527, 137/514; 251/87, 84

[56] References Cited

U.S. PATENT DOCUMENTS

| | | | |
|---|---|---|---|
| 945,151 | 1/1910 | Blauvelt | 137/527.4 |
| 1,871,536 | 8/1932 | Le Bus | 137/527 |
| 3,098,502 | 7/1963 | Deve | 137/514 |
| 3,106,220 | 10/1963 | Hose | 137/514 |
| 3,283,772 | 11/1966 | Ensign | 137/527.4 |
| 3,996,962 | 12/1976 | Sutherland | 137/527.4 |
| 4,601,309 | 7/1986 | Chang | 137/514 |
| 5,145,005 | 9/1992 | Dollison | 137/527 |
| 5,261,449 | 11/1993 | Smetters | 137/514 |

FOREIGN PATENT DOCUMENTS

| | | | |
|---|---|---|---|
| 611819 | 10/1960 | Italy | 137/527.4 |
| 63-60274 | 11/1988 | Japan | |
| 5-507999 | 11/1993 | Japan | |
| 811237 | 8/1956 | United Kingdom | 137/527 |

*Primary Examiner*—Denise L. Ferensic
*Assistant Examiner*—Joanne Y. Kim
*Attorney, Agent, or Firm*—Ladas & Parry

[57] ABSTRACT

The invention has its object to radically resolve an untapped technical issue in a non-water hammering check valve device, in which a valve disc, a valve seat and a surrounding flow passage are configured such that the valve disc is substantially seated on the valve seat at the time when input to a pump is shut off and a discharge flow in the flow passage loses inertia to stop, and to provide a reasonable non-water hammering check valve device of a simple and clear construction which suffers a small resistance loss of a valve at the time of a predetermined maximum flow rate, can readily accommodate an abrupt change in a flow state without delay in valve closing operation and provides a uniform and close seating on the valve seat at the time of valve seating to prevent water hammering. In the non-water hammering check valve device, a valve disc (4) is connected to an arm portion (5) through a valve disc support shaft (6) with a required freedom of swinging, and the arm portion (5) is connected to a valve body (1) through an arm support shaft (7). At the time of valve opening, the valve disc (4) is caused by an additional acting force, which turns the valve disc (4) about the valve disc support shaft (6), to be floatingly supported in the flow passage while an upstream end (4a) of the valve disc and an upstream end (5a) of the arm portion preferentially abut against each other all the time. At the time of valve closing, a downstream end (4b) of the valve disc preferentially abuts against a valve seat (3), and in a subsequent valve seating stroke, the entire surface of the valve disc (4) comes into uniform and close contact with the valve seat (3) to prevent water hammering caused by counterflow.

10 Claims, 4 Drawing Sheets

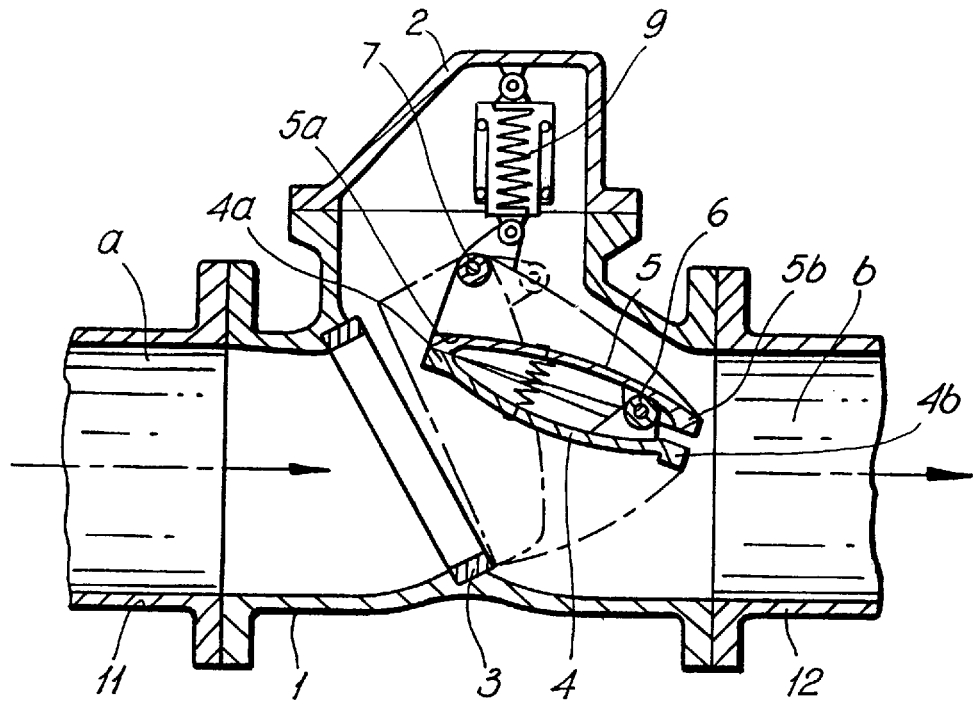
F I G. 1
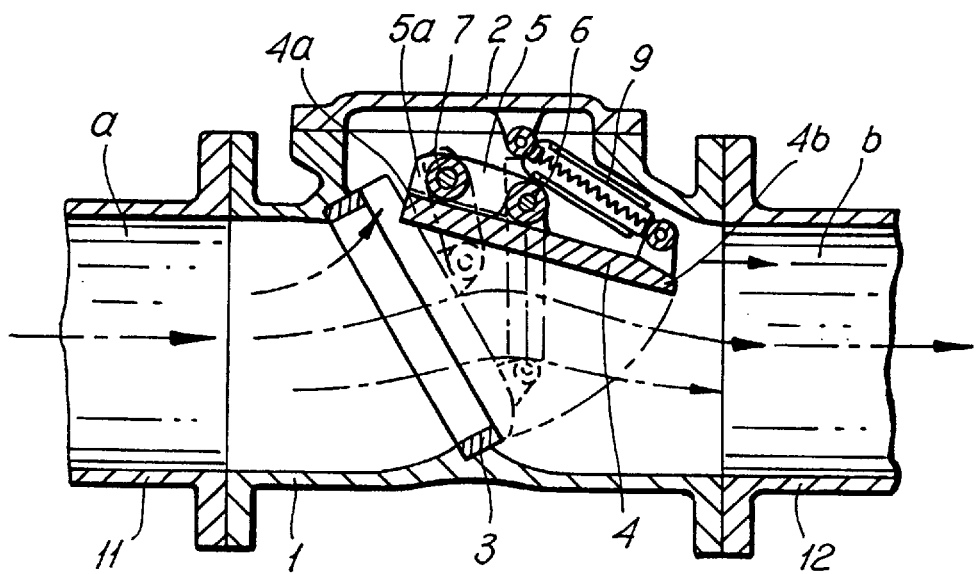
F I G. 2

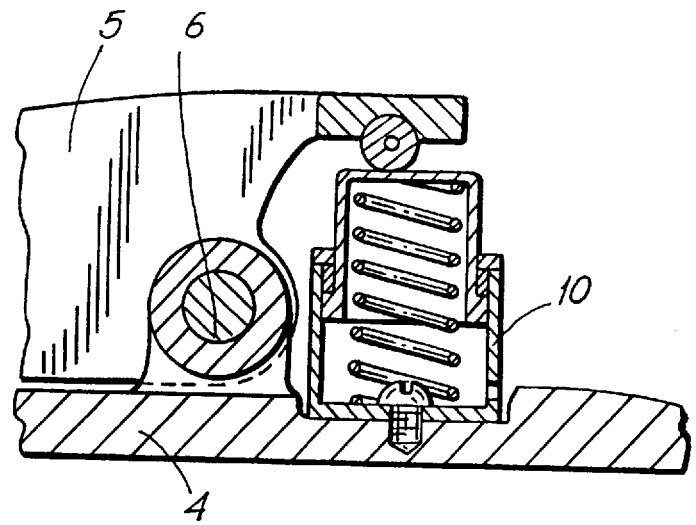
F I G. 7
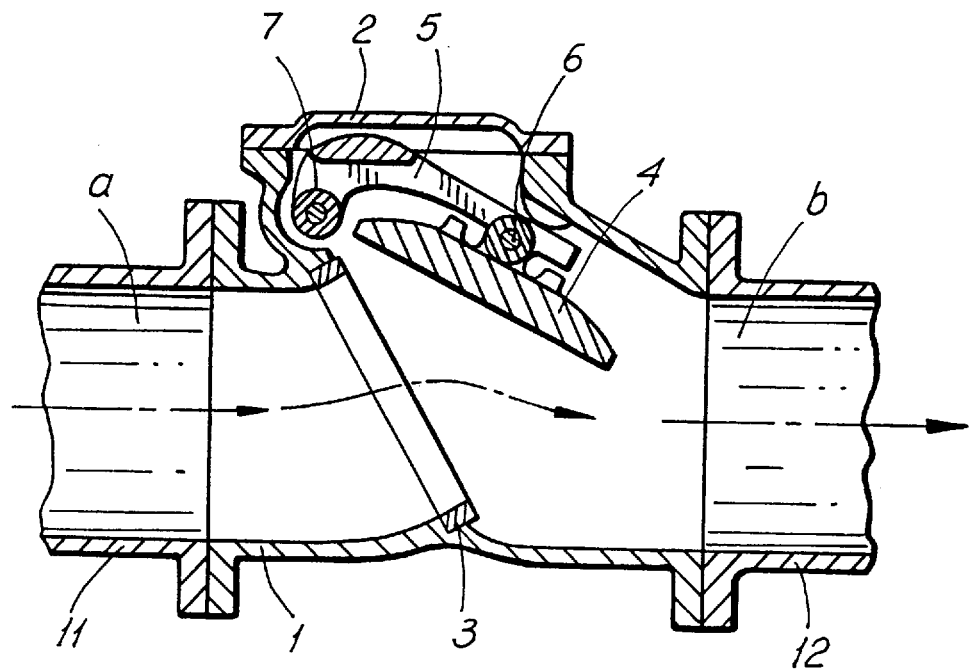
F I G. 8

COMPOSITE ACTION TYPE WATER-HAMMER-PREVENTIVE CHECK VALVE

TECHNICAL FIELD

The present invention relates to a water-hammer-preventive (or "non-water-hammering") check valve placed in a pipeline and capable of safely and reliably preventing water hammer due to the reverse flow of water in the pipeline resulting from a sudden stop of energy supply to a pump during a pumping operation. In this specification, the term "water" is used in its broad sense to denote any kind of fluids, and the terms "upstream", "downstream", "inlet" and "outlet" refer to directions and positions based on the normal flow (not the reverse flow) of a fluid.

BACKGROUND ART

When the action of a check valve placed in a pipeline is unable to follow a sudden change in the flow velocity of a fluid flowing through the pipeline and the valve element of the check valve is seated on a valve seat during the reverse flow of the fluid, water hammer occurs on the downstream side of the check valve sometimes causing serious troubles. Inventions that provide water-hammer-preventive check valves are disclosed in, for example, JP-B Nos. 40-3654, "Water-Hammer-Preventive Pumping Apparatus", 51-25930, "Improvements in Water-Hammer-Preventive Pumping Apparatus", and 63-60274, "Swing Type Water-Hammer-Preventive Check Valve". These inventions will be inclusively designated as "prior inventions". As is generally known, these prior inventions have been widely used. The present invention relates to improvements in the water-hammer-preventive check valves of the prior inventions.

The water-hammer-preventive check valves of the prior inventions were based on a clear technical idea surpassing a hitherto prevalent technical idea of preventing water hammer (symptomatic means using a control means that permits a valve element to be seated on a valve seat when a reverse flow acts on the valve element due to a delay in the valve closing movement and slows the movement of the valve element or using an automatic valve or a surge tank that avoids or buffers pressure rise due to water hammer). More concretely, it is readily inferred from the description in the specifications of the prior inventions that the prior inventions incorporate radical improvements including designing a valve element and the shapes of flow passages around the valve element so that a valve element is seated on a valve seat upon the stoppage of the flow of water flowing in a discharge direction in the line after the exhaustion of the inertia of water after power supply to a pump has been stopped to prevent the reverse flow of water and to remove causes of water hammer positively. A water-hammer-preventive check valve of the prior invention shown in FIG. 8 is constructed to eliminate as many factors that impede the closing motion of a valve element as possible and to enable a valve element to move down by its own weight for a proper closing motion. This water-hammer-preventive check valve corrects some errors, if any, by the action of a weight, a spring or the like and achieves substantially satisfactorily an object of preventing water hammer.

However, persons skilled in the art have been encountered by the following technical problems when carrying out the fundamental techniques of the water-hammer-preventive check valve of the prior inventions.

(A) When an arm member to be connected to a valve casing is fixedly joined to a valve element to form a single link, the valve element is unable to be seated closely on a valve seat unless parts are formed with high accuracy.

(B) Although a valve element is able to be seated closely on a valve seat when the valve element and an arm member are fabricated simply in two separate links and the arm member is connected to a valve casing, i.e., when the valve element is connected simply to an arm member with a necessary clearance therebetween and the arm member is connected to a valve casing, another problem arises; that is, an end portion of the valve element on the upstream side comes into contact with the valve seat first obliquely sliding along the valve seat due to the flapping of the valve element and, sometimes, the end portion scratches on the valve seat to obstruct the smooth movement of the valve element (such a mode of movement of the valve element will be referred to as "oblique seating and scratching" hereinafter for the sake of explanation). Such a mode of movement of the valve element has not only the possibility of damaging itself and the valve seat but also the possibility of permitting reverse flow that induces water hammer. Such troubles tend to be more significant as water-hammer-preventing check valves become large and as the operating conditions become severe, examples of such severe conditions being a short time interval to the occurrence of the reverse flow and an unstable flow in the pipelines. A means for mitigating the harmful effects of "oblique seating and scratching" disposes a shaft for supporting the arm member on a prolongation of the surface of the valve seat if possible. However, conditions for securing the position of the support shaft for supporting the arm member place restrictions on design, and precision machining and assembling are difficult.

Problems mentioned in (A) and (B) involve intricate, associated conditions and, actually, have been difficult to solve, and are unsolved technical problems even in the water-hammer-preventive check valve of the prior inventions. Accordingly, it is an object of the present invention to provide a water-hammer-preventive check valve capable of drastically solving those technical problems which have not been solved, having a rational construction that enables a valve element to perform an optimum action, capable of being easily designed and fabricated, and highly satisfactory in economic effects.

DISCLOSURE OF THE INVENTION

The present invention set forth in claim 1 will be described with reference to FIG. 1 showing a preferred embodiment thereof. A composite action type water-hammer-preventive check valve is disposed at an appropriate position in a discharge pipeline connected to a storage pump, not shown, between an inlet pipe 11 and an outlet pipe 12. A lid 2 is put on a valve casing 1 to form a passage between an inlet passage a and an outlet passage b. A valve element 4 is supported pivotally for necessary turning motion by a valve element support shaft 6 on an arm member 5, and the arm member 5 is supported pivotally by an arm member support shaft 7 on the valve casing 1 so as to support the valve element 4 swingably on the outlet side of a valve seat 3 inclined to the direction of the flow from the inlet passage a to the outlet passage b. The respective inertial masses of the valve element 4 and the arm member 5 are reduced to the least possible extent to enhance the ability of the valve element 4 to follow up the variation of the flow, and the valve element 4 and the arm member 5 are formed in shapes that exert low resistance on the flow. A valve element assembly including the valve element 4 and the arm member 5 has its center of gravity on the downstream side of the arm member support shaft 7 so that its weight produces a valve closing force. Further, in order to enable free adjustment of the valve closing force, a valve closing member 9 (a weight, spring, etc.) connects a stationary portion and the arm member 5 to urge the valve element toward the closing position. The positions at which the valve closing member 9 are joined are so selected that the valve closing force is at a minimum necessary value in the neighborhood of the valve fully open position and at a maximum necessary value in the neighborhood of the valve fully close position and that the total valve closing force at the valve fully open position balances with the valve opening force, that is, the force acting in the valve opening direction due to a predetermined maximum water flow. Since the valve element support shaft 6 is on the downstream side of the center of the valve element 4, pressure of the flow flowing in a discharge direction while the valve is open produces a valve element turning force that makes effort to bring an upstream end portion 4a of the valve element 4 into contact with an upstream end portion 5a of the arm member 5, i.e., a force to turn the valve element 4 clockwise, as viewed in FIG. 1, about the valve element support shaft 6.

In the composite action type water-hammer-preventive check valve, the valve element 4 is in an embracing flow that flows past the valve element 4 while the check valve is open and is kept in a floating position by the valve opening force balancing the valve closing force as shown in solid lines in FIG. 1. Therefore, the valve element 4 starts a closing motion substantially simultaneously with the start of deceleration of the flow even if the deceleration of the flow starts suddenly. In this embodiment, the arm member support shaft 7 need not necessarily be positioned on a prolongation of the surface of the valve seat. For example, when the arm member support shaft 7 is positioned as shown in FIG. 1, the valve element 4 can be disposed nearer to the center of the passage than that of a prior art water-hammer-preventive check valve, and hence the valve element can be disposed nearer to an ideal embracing passage. It is known through observation that the upstream end portion 4a of the valve element 4 is kept in contact with the upstream end portion 5a of the arm member 5 by a valve element turning force produced by the pressure of the flow and exerted on the valve element 4 while the check valve is open.

When the valve element 4 turns in a closing direction toward the valve seat 3 as the flow in the pipeline decelerates, first a downstream end portion 4b of the valve element 4 comes into contact with the valve seat 3 as shown in one-dot chain line in FIG. 1, and then the upstream end portion 4a of the valve element 4 is separated from the upstream end portion 5a of the arm member 5 and the entire working surface of the valve element 4 comes into contact with the valve seat 3. Such a mode of closing operation of the valve element 4 eliminates the harmful effects of oblique seating and scratching, which have been the problem heretofore, and the valve element 4 can be smoothly seated on the valve seat 3 without undue delay in the closing operation even under severe operating conditions such as an extremely short time interval to the occurrence of the reverse flow. Since the valve element 4 has a proper degree of freedom of movement with respect to the valve element support shaft 6, the same is able to be seated uniformly in close contact on the valve seat 3. The present invention defined in claim 1 and shown in FIG. 1 solves the aforesaid unsolved problems clearly with economical effectiveness.

In FIG. 2 is shown a composite action type water-hammer-preventive check valve wherein a valve closing member 9 is connected to the neighborhood of a downstream end portion 4b of the valve element 4 so that the valve closing member 9 can produce a valve closing force as well as a valve element turning force. The mode of operation of this check valve is the same as that of FIG. 1 and will not be described in detail.

In relation to claim 2, the invention will be described with reference to FIGS. 3 to 5. The water-hammer-preventive check valve shown has a braking device 10 provided as an auxiliary means to cope with variations in the timing of the valve element seating under special operating conditions, for example, when it is difficult to determine a fixed valve closing force because the flow in the pipeline is unstable. Such measure can also perfectly prevent water hammer and clearly and economically solve the problems encountered in conventional art. The braking device itself is conventional so that detailed description thereof will not be made. In this check valve, the timing of start of the braking operation is after the downstream end portion 4b of the valve element 4 comes into contact with the valve seat 3, that is, after the valve seat 3 has begun to bear part of the seating contact force of the valve element. Therefore, the braking device may be of a far compact construction as compared with a generally known conventional dashpot type slow-closing check valve. FIG. 3 shows an embodiment having a braking device 10 provided on the outside of the valve casing 1; FIG. 6 shows an example of the braking device (dashpot); and FIGS. 4 and 5 show embodiments having a braking device 10 provided within the valve casing 1, an example of the braking device (dashpot) being shown in FIG. 7. In FIG. 6 is shown a means for simply carrying out fine adjustment of the timing of the start of the braking by using an adjustment screw or the like.

BRIEF DESCRIPTION OF THE DRAWINGS

FIG. 1 is a longitudinal sectional view of a first embodiment of the present invention in a substantially fully open state;

FIG. 2 is a longitudinal sectional view of another embodiment in a substantially fully open state;

FIG. 7 is a longitudinal sectional view of a braking device shown in FIGS. 4 and 5; and FIG. 8 is a longitudinal sectional view of a prior art water-hammer-preventive check valve.

BEST MODE FOR CARRYING OUT THE INVENTION

Figure 3:
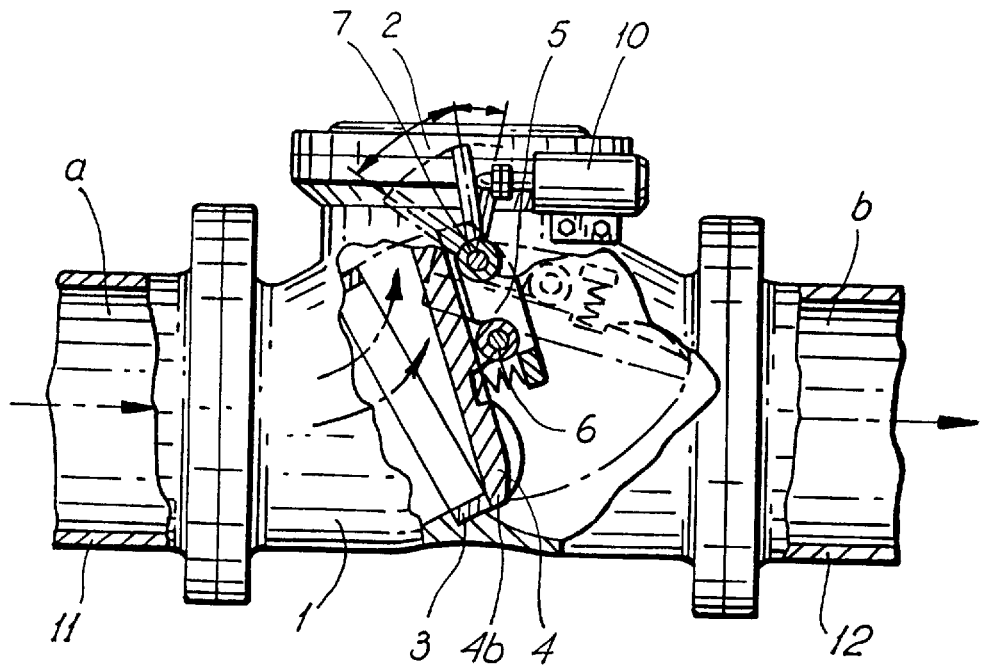
FIG. 3 is a longitudinal sectional view (partly a side view) of a further embodiment in a state immediately before the start of a valve element seating action.
Figure 4:
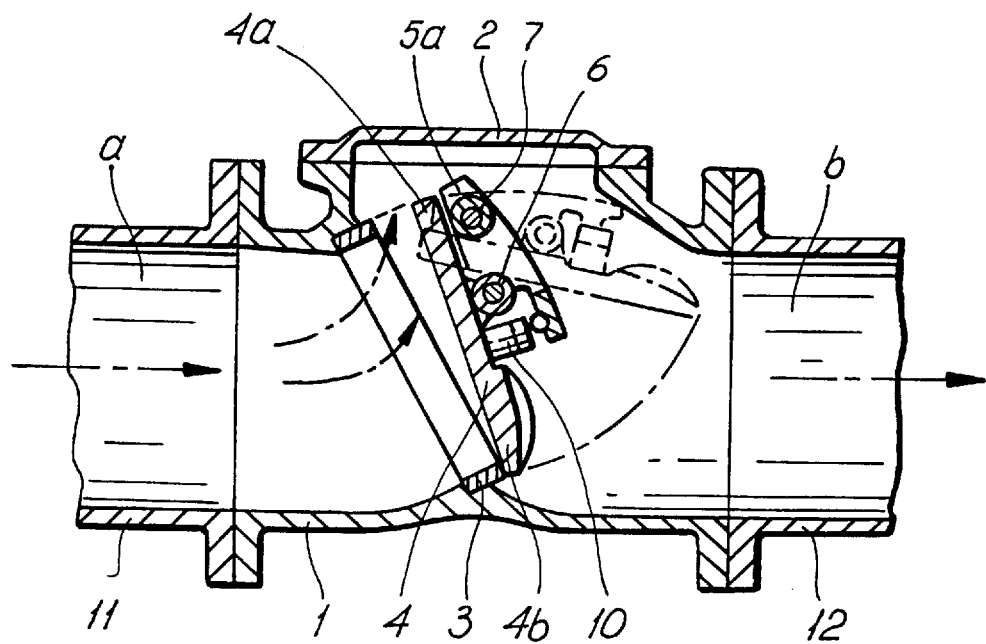
FIG. 4 is a longitudinal sectional view (partly a side view) of a still further embodiment of the present invention in a state immediately before the start of a valve element seating action.
Figure 5:
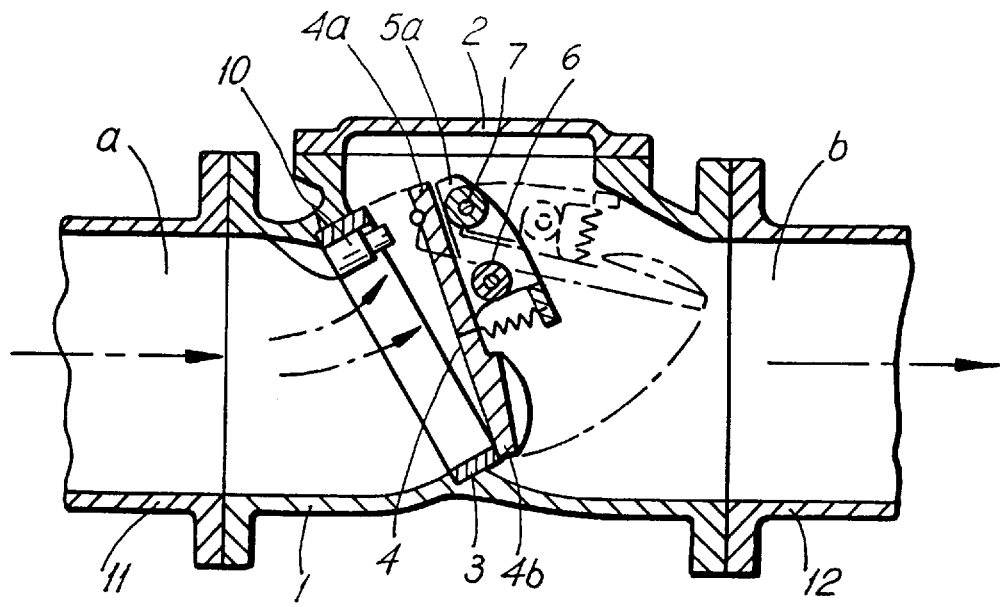
FIG. 5 is a longitudinal sectional view (partly a side view) of another embodiment of the present invention in a state immediately before the start of a valve element seating action.
Figure 6:
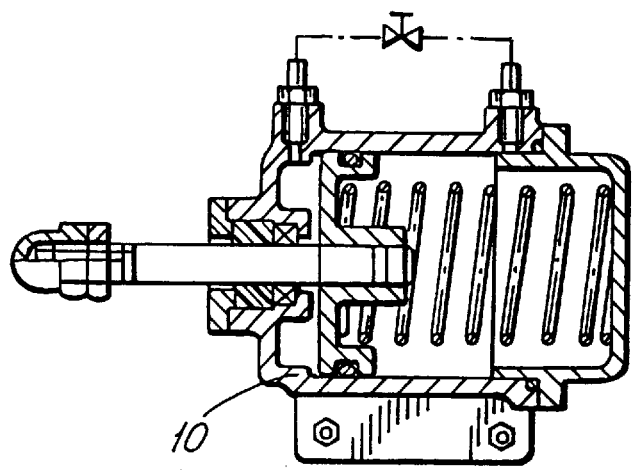
FIG. 6 is a longitudinal sectional view of a braking device shown in FIG. 3.

As mentioned above the composite action type water-hammer-preventive check valve in accordance with the present invention has a remarkable effect in preventing water hammer and is capable of meeting various practical requirements by incorporating various structural modifications and prior art techniques. Although the composite action type water-hammer-preventive check valve shown by way of example in FIG. 1 uses the pressure exerted by the flow on the valve element 4 for producing the valve element turning force, i.e., a force to turn the valve element 4 clockwise, as viewed in FIG. 1, about the valve element support shaft 6, a valve element turning force may be produced by the own weight of the valve element 4 by supporting the valve element 4 at a position thereof on the upstream side of its center of gravity on the valve element support shaft 6. Further, as shown in FIGS. 3 to 5, a spring may be extended between the valve element 4 and the arm member 5 to bias the valve element positively in the direction in which the valve element turning force acts on the valve element so that the valve element turning force is hardly affected by intense turbulent flows and deflected flows in the passage. Alternatively, the valve element turning force may be produced only by the spring.

As described before, the valve closing member 9 can be designed to have different points of connection so that a desirable valve closing operation will be performed in such a manner that in the neighborhood of the valve fully open position a minimum necessary valve closing force is produced to reduce resistance loss and in the neighborhood of the valve closed position a maximum necessary valve closing force is created. FIGS. 1 and 2 show a telescopically slidable double-cylindrical case enclosing a valve closing member 9 for convenience of handling.

FIG. 1 shows an example in which a spring is interposed between the valve element 4 and the arm member 5 as a measure to prevent interference between the upstream end portion 4a of the valve element and the valve seat 3 with resultant damage to the end portion 4a when the valve element 4 accidentally swings during the assembling operation.

Although the valve element support shaft 6 is disposed with its axis in parallel to that of the arm member support shaft 7 in the embodiments shown in FIGS. 1 to 5, the fitting portion of the valve element support shaft 6 may be formed so that a clearance is formed or the valve element support shaft 6 may be of a universal joint type (naturally, the movement of the valve element 4 is limited to a specified range) so that the valve element 4 is not only able to swing in directions about the arm member support shaft 7 but also able to move in directions with respect to the surface of the valve seat 3. Such a configuration holds the valve element 4 in a correct position during a valve closing operation and, in case a foreign matter is caught by any chance between the valve element 4 and the surface of the valve seat 3, the valve element support shaft 6, which is an important part, can be protected by the effect of the freedom of movement of the same. Since the arm member support shaft 7 need not necessarily be disposed on a prolongation of the surface of the valve seat 3, flexible design is possible and cast components can be easily formed. Use of the valve closing member 9 shown in FIGS. 1 and 2 and use of the braking device 10 are both extremely effective. These closing member 9 and the braking device 10 could both be provided together. Various changes in design are possible within the scope of the present invention and the present invention is not limited to the foregoing embodiments.

INDUSTRIAL APPLICABILITY

As is apparent from the foregoing description, the present invention solves unsolved problems in the conventional water-hammer-preventive check valves, realizes an epoch-making composite action type water-hammer-preventive check valve of a simple construction causing a less loss due to the resistance of the valve even when water flows at a predetermined maximum flow rate, and capable of responding to a sudden change in the flow, of carrying out the valve closing operation without delay, and of uniformly and closely seating the valve element on the valve seat without oblique seating and scratching. The present invention is capable of readily dealing with increase in bore size and designing large-size check valves, and produces excellent results in design, manufacture, maintenance and management. The practical application of the present invention, as compared with that of the prior art, provides great advantages.

We claim:

1. A composite action type water-hammer-preventive check valve, comprising:

a valve casing having therein a flow passage with a flow line along which a fluid flows;

a valve seat disposed across said flow line in an inclined attitude relative to the flow line so that the valve seat has an upstream lateral side positioned upstream of a downstream lateral side with respect to said flow line;

an arm member in said valve casing at a position downstream from said valve seat and pivotably connected to said valve casing by an arm member support shaft positioned adjacent to said upstream lateral side of the valve seat, said arm member having an upstream end portion adjacent to said upstream lateral side of the valve seat and a downstream end portion;

a valve element shaped to provide small flow resistance and small inertial resistance and pivotably connected to said arm member by a valve element support shaft, said valve element being positioned to face said valve seat at a downstream side thereof and being movable between a fully open position away from the valve seat and a fully closed position in which the valve element is in close contact with said valve seat, said valve element having an upstream end portion for contacting said upstream lateral side of the valve seat, and a downstream end portion for contacting said downstream lateral side of the valve seat, said valve element being disposed to be gravitationally urged in a valve closing direction;

said valve element being urged to turn around said valve element support shaft so that said upstream end portion of the valve element is caused to contact said upstream end portions of the arm member; and a valve closing member connected between said valve casing and one of said arm member and said valve element to urge said arm member and said valve element in said valve closing direction, said valve closing member being provided at such a position as to provide a minimum value of valve closing force in said valve fully open position of the valve and a maximum value of valve closing force in said valve closing position;

whereby when fluid flow along said flow line through said passage stops, due to cessation of inertia after power supply to a pump is stopped, the valve element will be seated on the valve seat with said downstream end portion of the valve element first contacting the valve seat and with said upstream end portion of the valve element thereafter contacting the valve seat.

2. The composite action type water-hammer-preventive check valve according to claim 1, wherein said valve closing force in a valve fully open position is adjusted to balance a valve opening force exerted by the fluid flow.

3. The composite action type water-hammer-preventive check valve according to claim 1, wherein said valve closing member is a spring.

4. The composite action type water-hammer-preventive check valve according to claim 1, wherein said flow passage extends substantially horizontally.

5. The composite action type water-hammer-preventive check valve according claim 1, further comprising:

a braking device for braking said valve element during movement of the valve element in which the downstream end portion of the valve element is caused to contact the valve seat and thereafter the upstream end portion of the valve element is caused to contact the valve seat.

6. A composite action type water-hammer-preventive check valve, comprising:

a valve casing having therein a flow passage with a flow line along which a fluid flows.

a valve seat disposed across said flow line at an inclined attitude relative to the flow line so that the valve seat has an upstream lateral side positioned upstream of a downstream lateral side with respect to said flow line;

an arm member in said valve casing at a position downstream from said valve seat and pivotably connected to said valve casing by an arm member support shaft positioned adjacent to said upstream lateral side of the valve seat, said arm member having an upstream end portion adjacent to said upstream lateral side of the valve seat and a downstream end portion;

a valve element pivotably connected to said arm member by a valve element support shaft to face said valve seat at a downstream side thereof to be movable between a fully open position away from the valve seat and a fully closed position in which the valve element is in close contact with said valve seat, said valve element having an upstream end portion for contacting said upstream lateral side of the valve seat, and a downstream end portion for contacting said downstream lateral side of the valve seat, said valve element being disposed to be gravitationally urged in a valve closing direction;

said valve element being urged to turn around said valve element support shaft so that said upstream end portion of the valve element is caused to contact said upstream end portion of the arm member; and a braking device for braking said valve element;

whereby when a fluid flow along said flow line through said passage stops due to cessation of inertia after power supply to a pump is stopped, the valve element will be seated on the valve seat with said downstream end portion of the valve element first contacting the valve seat, and with said upstream end portion of the valve element thereafter contacting the valve seat;

said braking device being operative to brake said valve element during movement of the valve element in which the downstream end portion of the valve element is caused to contact the valve seat and the upstream end portion of the valve element is thereafter caused to contact the valve seat.

7. The composite actin type water-hammer-preventive check valve according to claim 6, wherein said braking device is connected to act on said arm member.

8. The composite action type water-hammer-preventive check valve according to claim 6, wherein said braking device is disposed outside the valve casing to act on said arm member support shaft which extends outside of said valve casing.

9. The composite action type water-hammer-preventive check valve according to claim 6, wherein said braking device is connected to act between said valve element and said arm member.

10. The composite action type-water-preventive check valve according to claim 6, wherein said braking device is connected to act between said valve element and said valve seat.

* * * * *